(12) United States Patent
Kotchick et al.

(10) Patent No.: US 7,236,217 B2
(45) Date of Patent: Jun. 26, 2007

(54) PACKAGE OF OPTICAL FILMS WITH ZERO-GAP BOND OUTSIDE VIEWING AREA

(75) Inventors: Keith M. Kotchick, Saint Paul, MN (US); Anthony J. Freking, Vadnais Heights, MN (US); Satinder K. Nayar, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/346,615

(22) Filed: Jan. 16, 2003

(65) Prior Publication Data

US 2004/0141103 A1    Jul. 22, 2004

(51) Int. Cl.
*G02F 1/1335*    (2006.01)

(52) U.S. Cl. .................... 349/62; 349/58; 349/64; 349/65; 349/95; 349/114; 349/119; 349/187

(58) Field of Classification Search ........... 349/119
See application file for complete search history.

(56) References Cited

U.S. PATENT DOCUMENTS

| | | | |
|---|---|---|---|
| 3,754,813 A | 8/1973 | DePalma | |
| 3,765,281 A | 10/1973 | Wolfe | |
| 3,788,171 A | 1/1974 | Hoadley | |
| 3,851,093 A | 11/1974 | Sunstein | |
| RE29,091 E | 12/1976 | DePalma | |
| 4,542,449 A | 9/1985 | Whitehead | |
| 4,576,850 A | 3/1986 | Martens | |
| 4,791,540 A | 12/1988 | Dreyer, Jr. | |
| 4,804,253 A | 2/1989 | Stewart | |
| 4,906,070 A | 3/1990 | Cobb, Jr. | |
| 4,971,719 A | 11/1990 | Vaz et al. | |
| 4,984,144 A | 1/1991 | Cobb, Jr. | |
| 5,005,108 A | 4/1991 | Pristash | |
| 5,076,668 A | 12/1991 | Dalisa | |
| 5,128,783 A | 7/1992 | Abileah | |
| 5,146,415 A * | 9/1992 | Faris ................ | 358/1.1 |
| 5,161,041 A | 11/1992 | Abileah | |
| 5,190,370 A | 3/1993 | Miller | |
| 5,207,493 A * | 5/1993 | Murase et al. ........ | 362/623 |
| 5,247,390 A | 9/1993 | Hed | |

(Continued)

FOREIGN PATENT DOCUMENTS

DE    3407431    8/1985

(Continued)

OTHER PUBLICATIONS

Partial translation of JP 7-43713.*

(Continued)

*Primary Examiner*—Andrew Schechter
(74) *Attorney, Agent, or Firm*—Scott A. Bardell (57) ABSTRACT

The invention is directed to a new packaging method in which several optical films are bundled together before insertion into the display frame. This bundling makes handling of the films easier, reduces the number of steps required for assembly of the display device, reduces the chance of damaging the films and increases yields. At least two of the films in the stack are bonded together using a zero-gap bond. The zero-gap bond lies outside the viewing area of the film.

47 Claims, 6 Drawing Sheets

U.S. PATENT DOCUMENTS

| | | | | |
|---|---|---|---|---|
| 5,268,782 | A | * | 12/1993 | Wenz et al. ............... 349/156 |
| 5,280,371 | A | | 1/1994 | McCartney, Jr. |
| 5,394,255 | A | | 2/1995 | Yokota |
| 5,435,963 | A | | 7/1995 | Rackovan et al. |
| 5,467,208 | A | | 11/1995 | Kokawa |
| 5,492,590 | A | | 2/1996 | Sakai et al. |
| 5,521,797 | A | | 5/1996 | Kashima |
| 5,550,657 | A | | 8/1996 | Tanaka |
| 5,552,907 | A | | 9/1996 | Yokota |
| 5,592,332 | A | | 1/1997 | Nishio |
| 5,596,429 | A | * | 1/1997 | Kokawa et al. ............... 349/67 |
| 5,598,280 | A | | 1/1997 | Nishio |
| 5,600,455 | A | | 2/1997 | Ishikawa |
| 5,600,462 | A | | 2/1997 | Suzuki |
| 5,627,926 | A | | 5/1997 | Nakamura |
| 5,659,408 | A | | 8/1997 | Wenyon |
| 5,748,269 | A | * | 5/1998 | Harris et al. ................ 349/58 |
| 5,767,931 | A | * | 6/1998 | Paczkowski ............... 349/158 |
| 5,771,328 | A | | 6/1998 | Wortman |
| 5,828,488 | A | | 10/1998 | Ouderkirk |
| 5,919,551 | A | | 7/1999 | Cobb, Jr. |
| 5,997,964 | A | * | 12/1999 | Klima, Jr. ................ 428/1.54 |
| 6,052,164 | A | | 4/2000 | Cobb, Jr. |
| 6,079,840 | A | | 6/2000 | Ono et al. |
| 6,104,854 | A | * | 8/2000 | Masaki et al. ............... 385/133 |
| 6,185,043 | B1 | | 2/2001 | Imamura |
| 6,191,833 | B1 | * | 2/2001 | Hirakata ..................... 349/61 |
| 6,322,236 | B1 | | 11/2001 | Campbell |
| 6,364,497 | B1 | * | 4/2002 | Park et al. ..................... 362/31 |
| 6,411,353 | B1 | * | 6/2002 | Yarita et al. ................... 349/59 |
| 6,462,794 | B1 | * | 10/2002 | Yoshikawa et al. ........... 349/95 |
| 6,538,709 | B1 | | 3/2003 | Kurihara |
| RE38,243 | E | | 9/2003 | Oe et al. |
| 6,613,421 | B2 | | 9/2003 | Jonza et al. |
| 6,661,482 | B2 | * | 12/2003 | Hara ........................... 349/96 |
| 6,661,487 | B2 | | 12/2003 | Takahashi et al. |
| 6,685,795 | B1 | | 2/2004 | Braun |
| 2002/0080598 | A1 | | 6/2002 | Parker et al. |
| 2002/0124950 | A1 | | 9/2002 | Klima |
| 2002/0149712 | A1 | * | 10/2002 | Kitamura et al. ............ 349/58 |
| 2002/0196397 | A1 | | 12/2002 | Takahashi et al. |
| 2003/0063251 | A1 | | 4/2003 | Murata et al. |
| 2003/0133207 | A1 | | 7/2003 | Minami et al. |
| 2005/0046767 | A1 | | 3/2005 | Freking et al. |
| 2006/0108050 | A1 | | 5/2006 | Satake et al. |

FOREIGN PATENT DOCUMENTS

| | | |
|---|---|---|
| EP | 0395957 | 11/1990 |
| EP | 0 531 939 | 3/1993 |
| EP | 0 770 899 | 5/1997 |
| EP | 1134068 | 9/2001 |
| EP | 1168282 A | 1/2002 |
| EP | 1220014 | 7/2002 |
| EP | 1302922 | 4/2003 |
| JP | 6-18707 | 1/1994 |
| JP | HEI-6-342106 | 12/1994 |
| JP | 07043713 A * | 2/1995 |
| JP | 08-248209 | 9/1996 |
| JP | 09-267424 | 10/1997 |
| JP | 11259021 | 9/1999 |
| JP | 2001301104 A | 10/2001 |
| JP | 2002304254 A | 10/2002 |
| JP | 2003-207767 | 7/2003 |
| WO | WO 96/27757 | 9/1996 |
| WO | WO 97/28468 | 8/1997 |
| WO | WO 0150160 | 7/2001 |
| WO | WO 0221167 A | 3/2002 |
| WO | WO 03010569 | 2/2003 |
| WO | WO 03/042747 | 5/2003 |

OTHER PUBLICATIONS

U.S. Appl. No. 10/830,733, Title Optical Products for Displays Filed Apr. 23, 2004, Nakayama et al., Number of pages, 16 specifications, 3 drawings.

U.S. Appl. No. 10/750,553, Title A Cover Removal Tab For Optical Products, Filed Dec. 31, 2003, Freking et al., Number of pages, 13 specifications, 4 drawings.

U.S. Appl. No. 11/036,521, Title: Pre-Stacked Optical Films, Filed Jan. 14, 2005, Freking et al., Number of pages: 13 specifications, 8 drawings.

* cited by examiner

PACKAGE OF OPTICAL FILMS WITH ZERO-GAP BOND OUTSIDE VIEWING AREA

FIELD OF THE INVENTION

The present invention is directed to optical displays, and more particularly to an approach for packaging light management optical films used in optical displays.

BACKGROUND

Optical displays, such as liquid crystal displays (LCDs) are becoming increasingly commonplace, finding use, for example in mobile telephones, hand-held computer devices ranging from personal digital assistants (PDAs) to electronic games, to larger devices such as laptop computers, and LCD monitors and television screens. The incorporation of light management films into optical display devices results in improved display performance. Different types of films, including prismatically structured films, reflective polarizers and diffuser films are useful for improving display parameters such as output luminance, illumination uniformity, viewing angle, and overall system efficiency. Such improved operating characteristics make the device easier to use and may also increase battery life.

The light management films are typically stacked, one by one, into the display frame between a backlight assembly and the flat panel display. The stack of films can be optimized to obtain a particular desired optical performance. From a manufacturing perspective, however, several issues can arise from the handling and assembly of several discrete film pieces. These problems include, inter alia, the excess time required to remove protective liners from individual optical films, along with the increased chance of damaging a film when removing the liner. In addition, the insertion of multiple individual sheets to the display frame is time consuming and the stacking of individual films provides further opportunity for the films to be damaged. All of these problems can contribute to diminished overall throughput or to reduced yield, which leads to higher system cost.

SUMMARY OF THE INVENTION

In view of the problems listed above, the present invention is directed to a new packaging method in which several optical films are bundled together before insertion into the display frame. This bundling makes handling of the films easier, reduces the number of steps required for assembly of the display device, reduces the chance of damaging the films and increases yields.

Generally, the present invention relates to packaging stacks of two or more light management films, where at least two of the films bonded together using a zero-gap bond.

One particular embodiment of the invention is directed to a light management film package for managing light within a display. The film package includes a stack of at least first and second optical films having respective first and second viewing areas in alignment to form a stack viewing area. There is a zero-gap bond between the first and second optical films, disposed outside the first and second viewing areas.

Another embodiment of the invention is directed to a display system that has an illumination unit, a display unit, and a light management unit disposed between the illumination unit and the display unit to manage light passing from the illumination unit to the display unit. The light management unit includes a stack of at least first and second optical films having respective at least first and second viewing areas in alignment to form a stack viewing area corresponding to a viewing area of the display unit. There is a zero-gap bond between the first and second optical films disposed outside the first and second viewing areas.

Another embodiment of the invention is directed to a method for stacking optical-films for an optical display. The method includes providing first and second optical films with respective viewing areas. The method also includes bonding the first and second optical films with a zero-gap bond outside viewing areas of the first and second optical films.

Another embodiment of the invention is directed to a light management film package for managing light within a display. The film package includes a first optical film having a first surface and a second optical film disposed over the first optical film. The second optical film has a first surface bonded to the first surface of the first optical film at a zero-gap film bond. A center viewing portion of the second optical film remains unbonded to the first optical film.

Another embodiment of the invention is directed to a display system that has an illumination unit, a display unit, and a light management unit disposed between the illumination unit and the display unit to manage light passing from the illumination unit to the display unit. The light management unit includes a stack of at least first and second optical films, the first optical film having a first surface and the second optical film being disposed over the first optical film. The second optical film has a first surface bonded to the first surface of the first optical film at a zero-gap film bond. A center viewing portion of the second optical film remains unbonded to the first optical film.

Another embodiment of the invention is directed to a light management film package for managing light within a display. The package includes a first optical film having a first surface, and a second optical film disposed over the first optical film. The second optical film has a first surface bonded to the first surface of the first optical film by a zero-gap bonding means for bonding the first and second optical films together. A center viewing portion of the second optical film remains unbonded to the first optical film.

Another embodiment of the invention is directed to a light management film package for managing light within a display. The film package includes a stack of at least first and second optical films having respective first and second viewing areas in alignment to form a stack viewing area. A zero-gap bond means for bonding films between the first and second optical films is disposed outside the first and second viewing areas.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to displays, such as liquid crystal displays, and is particularly useful for reducing the number of steps required for making such a display.

Figure 1:
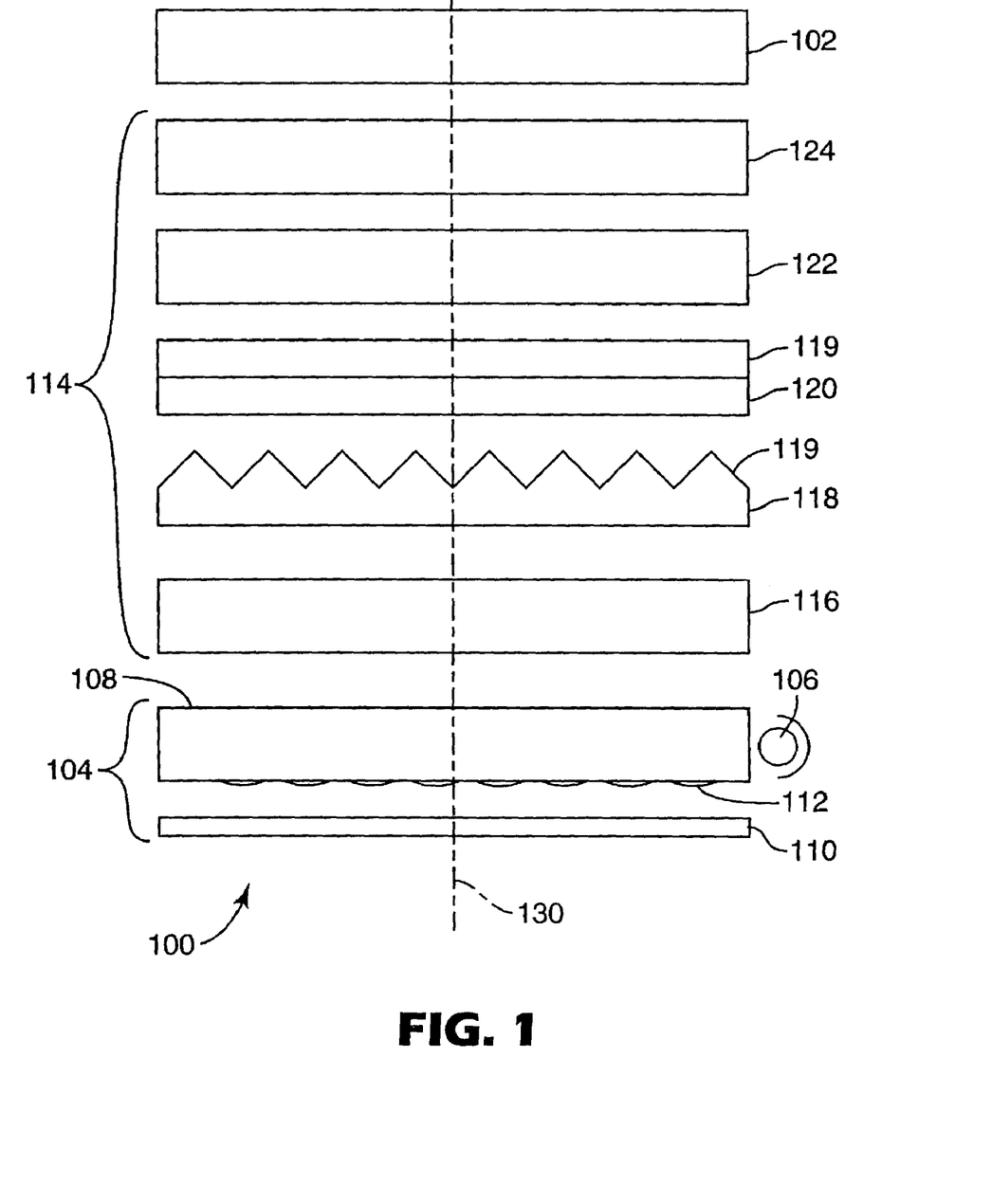
FIG. 1 schematically illustrates a display unit.

A display system 100 is schematically shown in FIG. 1. The system includes in electronic display element 102, such as a liquid crystal display (LCD) panel, which is typically sandwiched between two glass layers. Furthermore, the display element 102 may include absorbing polarizers above and below the LCD panel to provide the polarization contrast typically required for producing a polarization-based image.

A backlight assembly 104 may be used as the primary light source for the display element 102, or may be used for providing light through the display element 102 when there is insufficient ambient light for the user to view the image formed by the display element 102. In one particular embodiment, backlight assembly 104 may include several elements such as a light source 106, a light guide 108, and one or more reflector layers 110. An important feature of the display system 100 in many applications is that the total thickness of the system 100 be small. Accordingly, the light source 106 is commonly positioned to the side of the light guide 108, and the light guide 108 directs the light from the light source 106 up through the system 100 towards the display element. The light source 106 may be any suitable type of light source. In many applications, it is desirable to illuminate the display 100 with white light, in which case the light source 106 may be a fluorescent lamp, an array of light emitting diodes whose colors are mixed to produce white light, or the like.

In the illustrated embodiment, the light guide 108 is provided with diffusely reflecting regions 112 that direct light from the light guide 108 towards the display element 102. The light guide 108 may include other types of elements for directing light towards the display element 102, such as light extraction regions on the upper surface of the light guide 108 facing the display element. Light extraction features may also be provided on both the upper and lower surfaces of the light guide 108. It will be appreciated that the light guide 108 may be in the form of a slab, as illustrated, but may also be in another geometry, for example a wedge. Also, other devices may be used to transmit light from the light towards the display element 102.

Other embodiments of backlight assembly may also be used, for example, the backlight assembly may be formed with an array of lamps positioned in a suitable reflective cavity. While there are several other options for the design of backlight assembly, it should be appreciated that the specific design of the backlight assembly is not important for the present invention.

A number of light management films are typically interposed between the backlight assembly 104 and the display element 102 in a light management film stack 114. The light management film stack 114 typically contains a number of films to control various optical characteristics of the light incident on the display element 102. For example, the light management film stack may include a first diffuser film 116. The first diffuser film may be used to help homogenize the intensity of the light passing up through the film stack 114.

Films 118 and 120 may be structured films, each having a row of prism-shaped ribs 119 running across its upper surface. The prism-shaped ribs help to direct the light towards the optical axis 130 of the system 100. The ribs 119 of the film 118 redirect the light in a direction parallel to the plane of the figure. The ribs of the film 120 are typically arranged non-parallel to those of the film 118. The ribs of the film 120 may be perpendicular to the ribs 119 of the film 118 so that the ribs of the film 120 redirect the light in a direction perpendicular to the plane of the figure. This may be referred to as a crossed-structure configuration. In another embodiment (not shown), the layers 118 and 120 may be substituted with a single structured optical film that redirects light received from the backlight assembly 104.

The stack 114 may also include a reflective polarizer layer 122. This layer is useful for recycling light from the backlight assembly 104 that is in the wrong polarization state for transmission through the display element 102 as image light. The light reflected by the reflective polarizer 122 may be diffusely reflected by the reflector 110, with some polarization mixing, so that at least a portion of the reflected light makes it through to the display element 102 with the correct polarization state for use as image light. In addition, a polarization converter, for example a quarter wave retarder layer may be used to convert the polarization of the light reflected from the reflective polarizer 122. The reflective polarizer 122 may be any suitable type of reflective polarizer, for example a multi-polymer layer film, a cholesteric polarizer or a wire-grid polarizer.

The stack 114 may also include another diffuser sheet 124, often referred to as the "cover sheet". The diffuser sheet 124 is typically a relatively weak diffuser. The diffuser sheets 116 and 124 may be useful for making the illumination of the display element 102 uniform to the viewer. It should be noted that depending on the actual system design, some of the elements represented by layers 116–124 may be missing, added to, or substituted with other functional elements.

With such a film stack 114, each of the discrete optical film layers 116–124 must be individually inserted to the display frame during manufacture. Since it is often important to reduce the thickness of the films 116–124, to reduce overall display thickness, the individual films 116–124 may be made very thin. As a result, the individual film stiffness may be low, which can result in increased difficulty in handling, processing, and assembly during manufacture. Also, because these film layers often have precise optical functionality, the introduction of surface defects, such as scratches or debris may compromise total system performance. Often, each film layer is provided with dual side protective liners, which must be removed prior to insertion into the backlight assembly. The action of liner removal and the resulting insertion into the backlight assembly can expose the delicate film to a host of potential modes of defect introduction. Examples of such defects include scratching, lint and other debris attracted to the film surfaces due to the build up of static electricity. In addition, the removal of the liners requires additional fabrication steps, and so the reduction in the number of liners to be removed results in fewer manufacturing steps, with a concomitant savings in manufacturing costs. When multiple film layers are incorporated into the backlight assembly, the probability of creating/introducing a defect can grow ever higher, which can result in slower manufacturing throughput due to excessive re-work and higher unit costs.

This invention is directed to approaches to bundling various optical film layers and/or components in order to improve handling and final backlight/system assembly efficiency.

One method of bundling multiple optical layers includes inserting an adhesive layer between each of the films. The adhesive layer may lie across the entire stack, from edge to edge, may be positioned along one or more edges of the stack, or may be patterned over the area of some or all of the film layers.

Such adhesive bonding can accomplish multiple film bundling, but each adhesive layer adds an incremental thickness, typically of the order of 25 µm or more. Such a large increase in the overall thickness of the film stack may be undesirable in the final construction, particularly in space-limited applications where the thickness of the film stack should be as small as possible. Also, the addition of an adhesive layer to a structured surface may result in an undesirable, significant deterioration in the refractive properties of the structured surface, or may possibly cancel out the refractive properties altogether. Thus, the light directing effect of films that have a structured refractive surface, such films as the prismatic films 118 and 120, may be compromised. Instead, it is desirable to build a packaged stack of optical films where the approach of bonding the film layers together maintains the desired refractive properties of any surface structure and, particularly in space-limited applications, adds little or no thickness to the stack thickness.

Figure 2A:
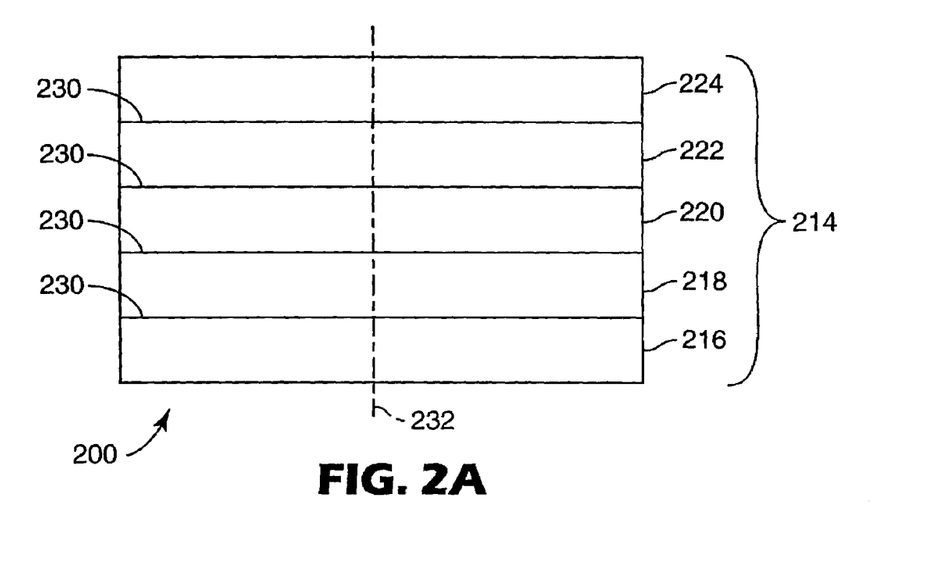
FIG. 2A schematically illustrates a light management film unit according to an embodiment of the present invention.

One approach to forming a bonded film stack 200 according to the present invention is schematically illustrated in FIG. 2A. Layers 216–224 represent different optical layers as may be found in a light management film stack in a display system. For example, layer 216 may be a diffuser layer, and layers 218 and 220 may be structured films for directing light, the orientation of layer 220 being crossed with respect to layer 218. Layer 222 may be a reflective polarizer layer while layer 224 may be a diffuser layer.

Bond 230 represents a bond that secures adjacent film layers together. Bond 230 may be a discrete bond that permits the presence of an air gap between unbonded portions of the film layers, for example where the surface of one of the films contains structure. Such an air gap may be useful in maintaining the efficient operation of certain optical films, such as structured optical films 218 and 220, for redirecting light towards the axis 232 of the stack 214. Bonds 230 may be located at one point or along several points in either a line or geometric pattern on the surface of the film layers 216–224. It may also be advantageous to position the bond 230 within side tabs of some or all of the layers 216–224. Such tabs may also serve as registration elements for mounting the bonded stack 200 into the display frame.

Figure 2B:
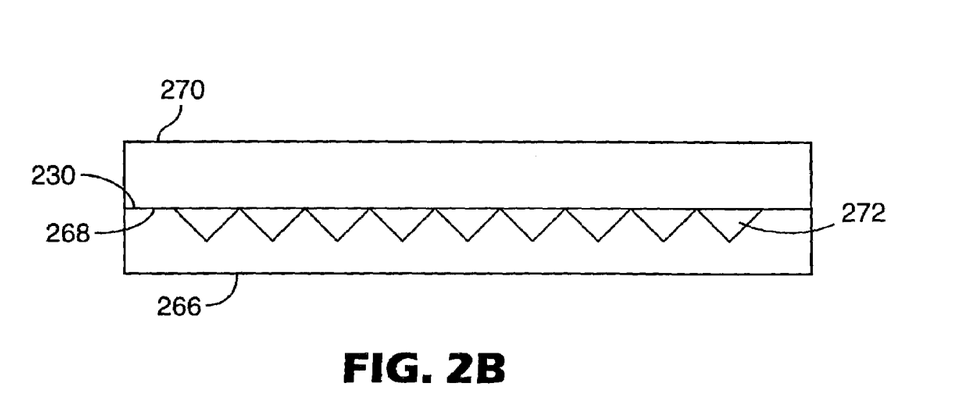
FIG. 2B schematically illustrates a light management film unit according to another embodiment of the present invention.

An expanded view, showing a bond 230 between a prismatically structured film 266 and another film 270, is schematically illustrated in FIG. 2B. In this embodiment, the land 268 at the peripheral edge of the prismatically structured film 266 is used for forming the bond 230. The air gap 272 between the films 266 and 270 permits the prismatically structured film to redirect the light passing therethrough, but does not add to the thickness of the film stack.

Different approaches may be used to reduce or prevent the degradation of the optical quality of the stacked films. For example, care is taken to reduce the presence of contaminant particles between the films that may lead to Newton's rings. Further, one or both of the surfaces that touch together may be provided with small height variations to reduce wet-out, for example as is discussed in U.S. Pat. No. 6,322,236, incorporated herein by reference. Also, a prismatically structured film may be provided with a variable height structured surface, as described in U.S. Pat. No. 5,771,328, incorporated herein by reference.

Different types of bond 230 may be used, each of which adds no significant thickness to the film stack. At the site of the bond 230, there is no gap between the film layers being bonded together. The film layers are bonded directly to each other, and the bond may, therefore, be referred to as a zero-gap bond, or a direct bond. The bond 230 may be a thermal weld, for example formed by ultrasonic welding, laser welding, or the like. The bonding element 230 may also be a solvent weld. For example, the optical light management film may be formed from an acrylate, such as polymethylmethacrylate, or from polycarbonate. Such films may be solvent welded using methylene chloride as the solvent. Another type of direct bond is a crimp, where the layers being bonded together are crimped to prevent movement of one layer relative to the other.

Figure 3:
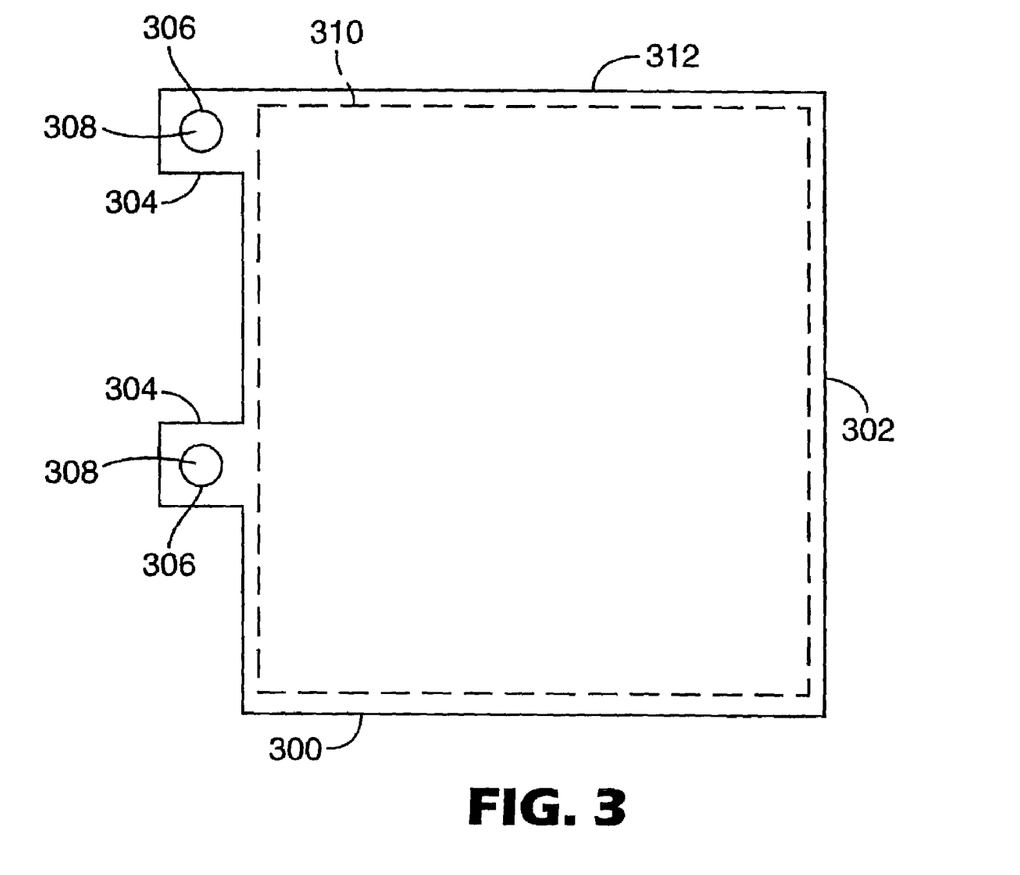
FIG. 3 schematically illustrates a top view of a light management film unit according to an embodiment of the present invention.

A top view of a bonded stack 300 of films is schematically presented in FIG. 3, showing only the topmost film sheet 302. The films in the stack have one or more peripheral tabs 304. The tabs 304 may take on many different shapes, number, and location depending on the specific design of the final backlight/system assembly. The tabs 304 may provide a convenient area to hold the stack 300 during assembly or inspection, and may also be used for registering the film stack when mounting the stack with the display. In the illustrated embodiment, annular, zero-gap bonds 306 are located in the area of the tabs 304. In the case of annular welds, the opening 308 in the center may be useful for engaging pins in the backlight assembly used for registration and mounting of the optical film stack 300. The zero-gap bonds 306; may also take on different shapes, for example, circular or linear.

The portions of the films, through which the light passes to the display element and to the viewer, are referred to as viewing areas. The viewing area of the topmost film 302 is shown schematically as the area enclosed within the dashed lines 310. In order to reduce the size of the film package, the viewing area preferably takes up as much of the film area as possible. The viewing area may extend, in some cases therefore, to approximately the edge of the film. Furthermore, it is important to maintain high optical quality in the viewing area. Since many bonding techniques used for making zero-gap bonds change the optical qualities of the film, it is important in many circumstances to place the zero-gap bond outside the viewing area. Thus, the zero-gap bond may be formed, for example on the peripheral edge 312 of the film itself or on a tab 304 that lies outside the viewing area.

An advantage of bonding together tabs on the films is that there is a reduced possibility of wicking the solvent in between the films when the films are bonded by solvent welding.

Figure 4:
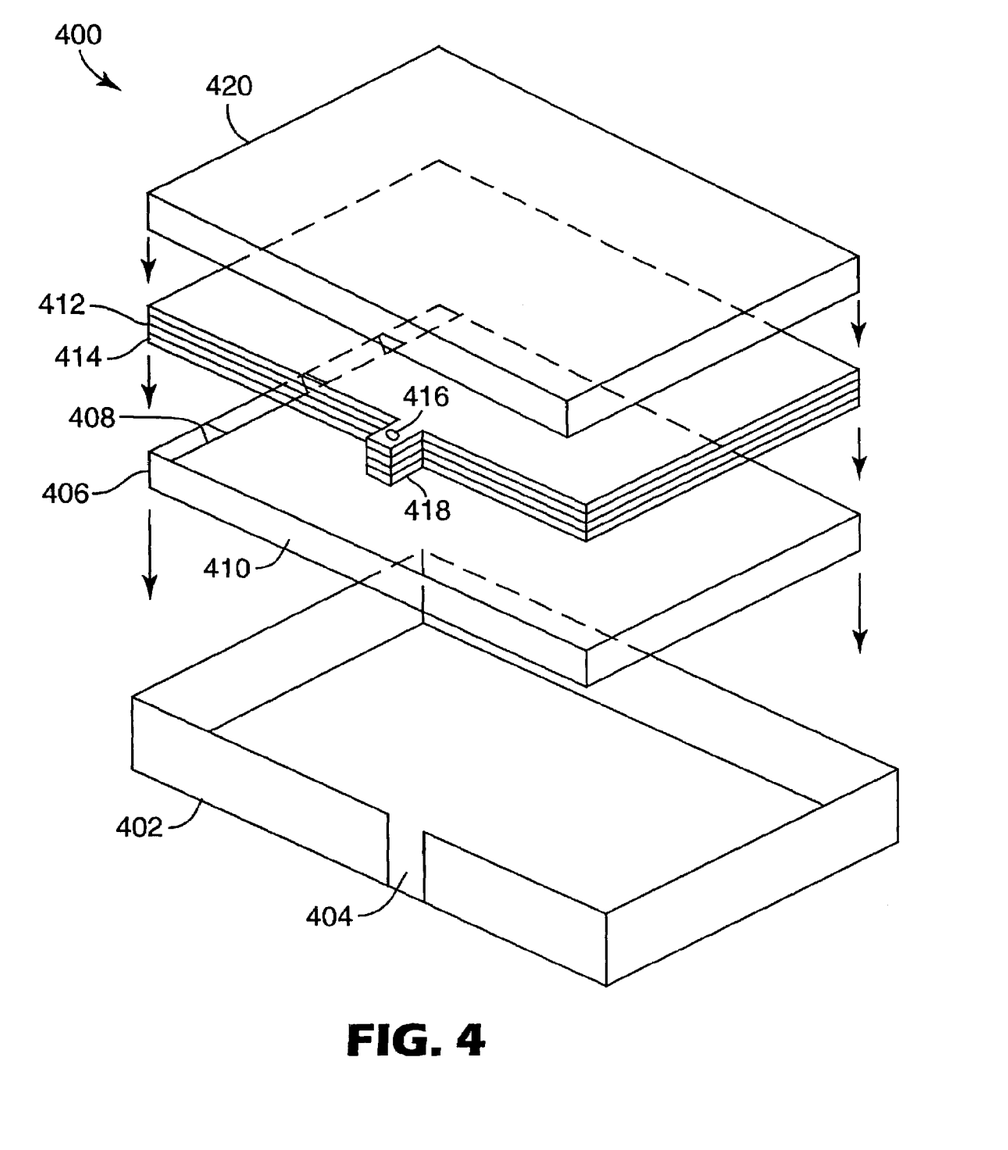
FIG. 4 schematically presents a perspective view of a display unit according to an embodiment of the present invention.

An exploded view of a display 400 is presented in FIG. 4, showing how the different parts of a display are assembled to form the display. The display 400 uses a frame 402 to contain the other components. The frame 402 may contain one or more slots 404, or other alignment features, for example pins or the like, for aligning the films in the light management film stack.

The backlight assembly 406 is the first component placed Within the frame 402. The backlight assembly 406 includes one or more light sources 408 that illuminate the edge of the light guide 410. The light management film stack 412 is then positioned above the backlight assembly 406. The light management film stack 412 includes two or more light management films 414 that are bonded together using a zero-gap bond 416. In the illustrated embodiment, the bond 416 is located on the alignment tab 418 that aligns the film stack 412 with the alignment slot 404. The display element 420, for example a liquid crystal display element, including polarizers, is positioned above the light management film stack 412.

It will be appreciated that the light sources 408 and the display element have electrical connections to receive electrical power and control signals. The electrical connections are not shown.

Figure 5:
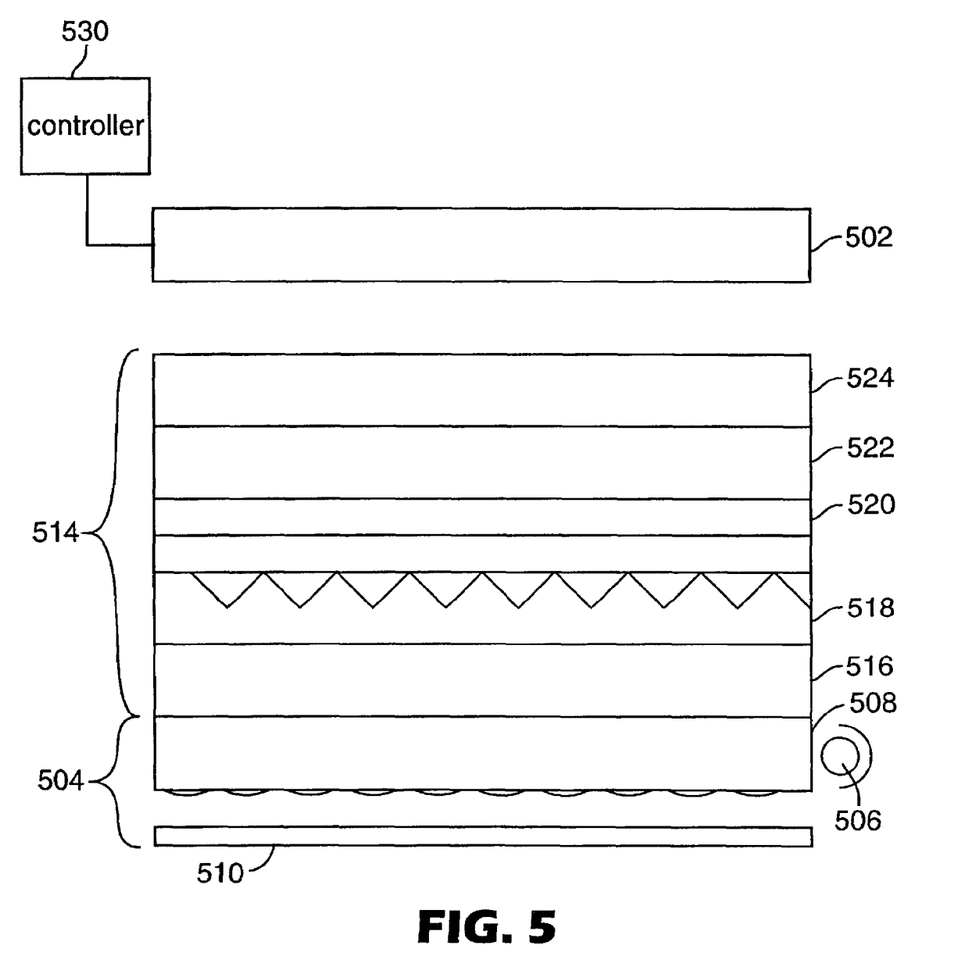
FIG. 5 schematically illustrates another embodiment of a display unit according to the present invention.

The bonded, light management film stack may also be bonded directly to one of the display elements. One example of such a display is schematically illustrated in FIG. 5. In this particular embodiment, a bonded film stack 514 is formed from a bonded stack films 516–524. In the illustrated embodiment, films 518 and 520 are prismatically structured films. Film 516 may be a diffuser or may be a light turning film, for example a prismatically structured film with the prismatically structured surface facing towards the backlight assembly 504.

The display also includes a display element 502 and a backlight assembly 504, having a light source 506, a light guide 508, and a lower reflector 510. The bonded optical film stack 514 may have been bonded together previously using one of aforementioned methods and then anchored to the chosen display element. In another approach, the bonding process may be performed during the final mounting to the chosen display element.

In the illustrated embodiment, the bonded film stack 514 is attached to the backlight assembly 504, for example using adhesive around the edges of film 516 and the light guide 508. In another embodiment, the optical film stack 514 may be anchored to the display element 502 or to the frame (not illustrated). This approach may be advantageous as it may be performed automatically, thereby avoiding manual insertion of the optical film stack. In this way, the introduction of defects may be minimized and manufacturing throughput and unit costs can be improved.

In some embodiments, the lower film 516 may extend beyond the right edge of the stack 514 and the overhanging portion of the film 516 may be used as a base on which to mount the light source 506.

A controller 530, for example a processor or the like, is typically coupled to the display element 502 to control the image seen by the viewer.

The use of a bonded film stacks, or bundled films, in such devices as flat panel displays offers several advantages. Many of the light management films used in a display are very thin. For example the prismatically structured films may each have a thickness of about 62 µm, while a reflective polarizer may have a thickness in the range of about 1 µm to 100's of µm. Light management films used in displays tend to be very flexible, which may cause problems during assembly of the display. Bundling multiple thin, flexible films, on the other hand, creates a stiffer film pack, which can ease assembly issues. Eliminating the sequential stacking of discrete layers when assembling the display also minimizes the probability of defect introduction and ultimate yield loss. Additionally, since films are usually delivered by the manufacturer to the display integrator with protective linings on either side, the number of protective liners that the display integrator has to remove is reduced when the films are bundled. This further optimizes yield and manufacturing unit costs.

Also, the bundling of optical films may improve final inspection and quality yield versus the separate examination of each discrete film layer. This can be easily considered when using structured optical films, which may tend to distort and camouflage defects in underlying or other film bundle layers that would otherwise be detected if these layers were inspected individually. Finally, bundling options, such as ultrasonic welding or other bonding techniques, can provide zero gap bonding functionality along with other mechanical mounting flexibility.

It will be appreciated that the film stack may, in addition to including at least two films bonded using a zero-gap bond, also include a bond between other films that is not a zero gap bond. For example, a non zero-gap bond may include adhesive disposed between two films.

Optical films are often fabricated in large sheets, in some cases on a roll. The individual film pieces that are assembled in a display are cut from the large sheet, usually by a die. Several different approaches may be used for bonding the films into bonded stacks using zero-gap bonds. For example, the films may be die-cut to the appropriate shape and then aligned in a stack and bonded. In other approaches, the films may be bonded at the same time as being die cut, or may be bonded even before being die cut. Furthermore, films may be bonded two or more at a time. Therefore, it should be appreciated that a stack that includes three or more films may be formed using two or more bonding steps. For example, the first two films may be bonded together to form the bonded stack and then one or more additional films bonded to the stack in one or more bonding steps.

Figure 6:
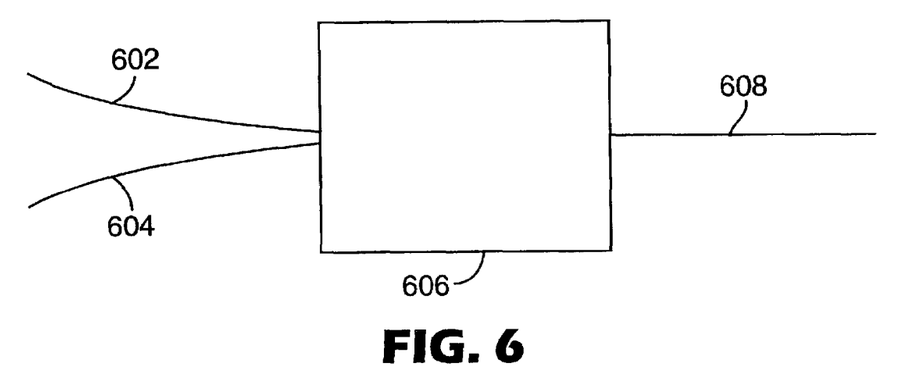
FIG. 6 schematically illustrates a general embodiment of a system useful for manufacturing a light management film unit according to the present invention.

A generalized approach to forming a zero-gap bonded stack is schematically illustrated in FIG. 6. Two sheets 602 and 604 of optical film are directed to a bonding device 606 that forms zero-gap bonds between the sheets 602 and 604, to produce a stack of zero-gap bonded film. There are several approaches to forming zero-gap bonds between the two sheets 602. One approach is to use a thermal bond, in which case the bond is formed by heating one or both of the layers to a point where the layer material softens and may even melt. Pressure may also be applied at the same time as heating or after heating. Heat may be applied in different ways. One approach to applying heat is through radiative heat transfer. One example of this is laser bonding, where the illuminating light is absorbed by one or both of the layers as heat. Another approach to applying heat is through conductive heat transfer, for example using a hot press. Heat may also be applied via convection, for example by directing hot gas at the bond site via a nozzle. Another approach for applying heat is by generating heat through friction. One example of this mode of energy transfer is ultrasonic welding.

Other ways of forming a zero-gap bond include chemical and mechanical approaches. One example of a chemical approach is to use a solvent disposed between the layers at the point the bond is to be formed. Examples of mechanical approaches include crimping the two layers. The layers may also be held together using a clip or may be held together in a frame surrounding part or all of the film stack.

Figure 7:
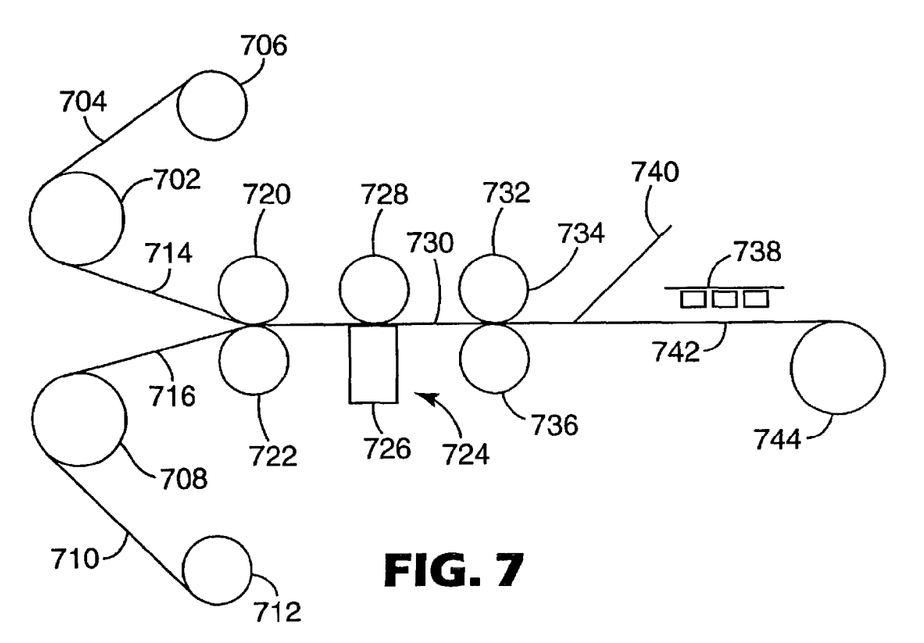
FIG. 7 schematically illustrates one embodiment of a system for manufacturing a film stack according to the present invention, using ultrasonic welding.

One particular example of a method for bonding at least two films together is now described with reference to FIG. 7. In this particular embodiment, an ultrasonic welder is used in a rotary geometry The process of matching and bonding films may be continuous.

A first film roll 702 contains a roll of film that has a liner on at least one side. The liner 704 is stripped by a stripping roll 706. A second film roll 708 may also contain a roll of film that has a liner on at least one side. The liner 710 is stripped by a second stripping roll 712. The stripped films 714 and 716 pass towards a roller pair 720 and 722. Following the roller pair is an ultrasonic welder unit 724. In this particular embodiment, the ultrasonic welder unit 724 comprises a stationary ultrasonic horn 726 and a rotary anvil 728. The anvil 728 typically includes raised portions that contact the film 714 and press the films 714 and 716 against each other, to the ultrasonic horn 726. The result is that a bonded film pair 730 passes out of the ultrasonic welder unit 724, having a repeated weld pattern along its length. The outer surfaces of the films 714 and 716 may still have liners on their outside surfaces so that the bonded film pair 730 has protective liners on its outside surfaces.

The bonded film pair may then pass to a pair of cutting rollers 732, having a rotary die 734 and a rotary anvil 736. The rotary die 734 is phased to the weld pattern on the film pair 730, and is used to cut out film stacks 738. In one particular embodiment, the rotary die 734 may kiss cut through the bonded film pair 730 to a controlled depth, to the lower liner of the lower film. The peripheral weed 740 may then be stripped away, leaving an array of film stacks on the lower liner layer 742. The lower liner layer 742 may then be received on a collection roller 744.

It is will be appreciated that this is just one embodiment of many different approaches to forming zero-gap bonds.

The two films 714 and 716 that may be any light management films. For example the first film 714 may be a prismatically structured film with the ribs oriented across the web of the film 714, while the second film 716 is a prismatically structured film with the ribs oriented along the web of the film 716. The first and second films 714 and 716 may also be other types of light management films, such as a diffuser or a reflective polarizer film.

In another method of stacking bonded sheets, different films may be fed in directions at right angles to each other. For example, two rolls of optical film may contain prismatically structured film, each having the ribs structured along the web. In such a situation, the films from the two rolls may cross at right angles to each other, so that the stacked prismatic films are crossed. A single welding and cutting tool may be used to weld and cut the films where they overlap with each other.

As noted above, the present invention is applicable to displays and believed is to be particularly useful for reducing the number of steps required for making such a display. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A light management film package for managing light within a display between a backlight and a display element, comprising:
   a stack of at least first and second light management optical films having respective first and second viewing areas in alignment to form a stack viewing area, a zero-gap bond between the first and second optical films being disposed only outside the first and second viewing areas, the stack being unattached to the backlight.

2. A film package as recited in claim 1, wherein the first and second optical films each have at least one respective peripheral tab outside the respective viewing areas, the at least one peripheral tabs of the first and second optical films being in registration and bonded together to form the zero-gap bond.

3. A film package as recited in claim 1, wherein the first and second optical films each have respective peripheral edges in registration, at least a portion of at least one peripheral edge of the first optical film being bonded together with at least one peripheral edge of the second optical film to form the zero-gap bond.

4. A film package as recited in claim 1, wherein the zero-gap bond is a thermal bond between the first and second optical films.

5. A film package as recited in claim 4, wherein the thermal bond is formed by ultrasonic welding.

6. A film package as recited in claim 4, wherein the thermal bond is a laser-welded bond.

7. A film package as recited in claim 4, wherein the thermal bond is formed by a hot press.

8. A film package as recited in claim 4, wherein the thermal bond is formed by a hot gas jet.

9. A film package as recited in claim 1, wherein the zero-gap bond is a chemical bond between the first and second optical films.

10. A film package as recited in claim 1, wherein the zero-gap bond is formed by crimping the first and second optical films.

11. A film package as recited in claim 1, wherein the first optical flint is a prismatic, light directing film having a prismatically structured surface oriented towards the second optical film.

12. A film package as recited in claim 11, wherein the second optical film is a prismatic, light directing film having a prismatically structured surface on a side of the second optical film away from the first optical film, ribs of the prismatically structured surface of the second optical film being oriented substantially perpendicular to ribs of the prismatically structured surface of the first optical film.

13. A film package as recited in claim 1, further comprising a third optical film having a third viewing area, a zero-gap bond between the second and third optical films being disposed outside the second and third viewing areas.

14. A film package as recited in claim 13, wherein the first and second optical films are prismatic, light directing films, and the third optical film is a reflecting polarizer.

15. A film package as recited in claim 1, further comprising a third optical film bonded to one of the first and second optical films via a non-zero-gap bond.

16. A film package as recited in claim 1, further comprising a display element, the stack of at least first and second optical films being attached to the display element.

17. A display system, comprising:
an illumination unit;
a display unit; and
a light management unit disposed between the illumination unit and the display unit to manage light passing from the illumination unit to the display unit, the light management unit comprising a stack of at least first and second light management optical films having respective at least first and second viewing areas in alignment to form a stack viewing area corresponding to a viewing area of the display unit, a zero-gap bond between the first and second optical films being disposed only outside the first and second viewing areas, the first and second films being bonded at a position separate from any attachment between the stack and either one of the illumination unit and the display unit.

18. A system as recited in claim 17, further comprising a control unit coupled to the display unit to control an image displayed by the display unit.

19. A system as recited in claim 17, wherein the display unit includes a liquid crystal display layer.

20. A system as recited in claim 19, further comprising an absorbing polarizer layer on a viewing side of the liquid crystal display layers and an absorbing polarizer on a light source side of the liquid crystal display layer.

21. A system as recited in claim 17, wherein the illumination unit includes one or more light sources illuminating a light guide panel, light from the one or more light sources entering the light guide panel and passing through a face of the light guide panel to the light management unit.

22. A system as recited in claim 17, further comprising a frame holding the illumination unit, the light management unit and the display unit.

23. A system as recited in claim 22, wherein at least the first and second optical films of the light management unit include one or more peripheral alignment tabs for locating the light management unit within the frame, the one or more peripheral alignment tabs being bonded together to form the zero gap bond.

24. A light management film package for managing light within a display, comprising:
a first optical film having a first surface; and
a second optical film disposed over the first optical film, the second optical film having a first surface bonded to the first surface of the first optical film at a zero-gap film bond, a center viewing portion of the second optical film remaining unbonded to the first optical film, the first and second films being banded without being attached to other elements of the display, one of the first and second optical films comprising one of a diffuser film, a reflective polarizer and a brightness enhancing film.

25. A film package as recited in claim 24, wherein the first and second optical films each have at least one respective peripheral tab outside the respective viewing areas, the at least one peripheral tabs of the first and second optical films being in registration and bonded together to form the zero-gap film bond.

26. A film package as recited in claim 24, further comprising a third optical film bonded to the second optical film via a zero-gap bond.

27. A film package as recited in claim 26, wherein the first and second optical films are prismatic, light directing films, and the third optical film is a reflecting polarizer.

28. A film package as recited in claim 24, wherein the first and second optical films each have respective peripheral edges in registration, at least a portion of at least one peripheral edge of the first optical film being bonded together with at least one peripheral edge of the second optical film to form the zero-gap bond.

29. A film package as recited in claim 24, wherein the zero-gap bond is a thermal bond between the first and second optical films.

30. A film package as recited in claim 29, wherein the thermal bond is an ultrasonic bond.

31. A film package as recited in claim 29, wherein the thermal bond is a laser-welded bond.

32. A film package as recited in claim 29, wherein the thermal bond is formed by a hat press.

33. A film package as recited in claim 24, wherein the zero-gap bond is a chemical bond between the first and second optical films.

34. A film package as recited in claim 24, wherein the zero-gap bond is a crimped bond between the first and second optical films.

35. A film package as recited in claim 24, wherein the first optical film is a prismatic, light directing film having a prismatically structured surface oriented towards the second optical film.

36. A film package as recited in claim 35, wherein the second optical film is a prismatic, light directing film having a substantially flat surface oriented towards the first optical film and a prismatically structured surface with fibs oriented substantially perpendicular to ribs of the prismatically structured surface of the first optical film.

37. A film package as recited in claim 24, further comprising a display element, the stack of at least first and second optical films being attached to the display element.

38. A film package as recited in claim 24, further comprising a backlight unit, the stack of at least first and second optical films being attached to the backlight unit.

39. A display system, comprising:
an illumination unit;
a display unit; and
a light management unit disposed between the illumination unit and the display unit to manage light passing from the illumination unit to the display unit, the light management unit comprising a stack of at least first and second optical films, the first optical film having a first surface and the second optical film being disposed over the first optical film, the second optical film having a first surface bonded to the first surface of the first optical film at a zero-gap film bond, a center viewing portion of the second optical film remaining unbonded to the first optical film, the first and second films being bonded at a position separate from any attachment between the stack and either one of the illumination unit and the display unit.

40. A system as recited in claim 39, further comprising a control unit coupled to the display unit to control an image displayed by the display unit.

41. A system as recited in claim 39, wherein the display unit includes a liquid crystal display layer.

42. A system as recited in claim 41, further comprising an absorbing polarizer layer on a viewing side of the liquid crystal display layers and an absorbing polarizer on a light source side of the liquid crystal display layer.

43. A system as recited in claim 39, wherein the illumination unit includes one or more light sources illuminating a light guide panel, light from the one or more light sources entering the light guide panel and passing through a surface of the light guide panel to the light management unit.

44. A system as recited in claim 39, further comprising a frame holding the illumination unit, the light management unit and the display unit.

45. A system as recited in claim 44, wherein at least the first and second optical films of the light management unit include one or more peripheral alignment tabs for locating the light management unit within the frame, the one or more peripheral alignment tabs being bonded together to form the zero gap bond.

46. A light management film package for managing light within a display between a backlight and a display element, comprising:
- a first light management optical film having a first surface; and
- a second light management optical film disposed over the first optical film, the second optical film having a first surface bonded to the first surface of the first optical film by a zero-gap bonding means for bonding the first and second optical films together, a center viewing portion of the second optical film remaining unbonded to the first optical film, the zero gap bond means not bonding the first and second films to the backlight.

47. A light management film package for managing light within a display between a backlight and a display element, comprising:
- a stack of at least first and second light management optical films having respective first and second viewing areas in alignment to form a stack viewing area, zero-gap bond means for bonding films between the first and second optical films being disposed only outside the first and second viewing areas, the zero gap bond means not bonding the first and second films to the backlight.

* * * * *

UNITED STATES PATENT AND TRADEMARK OFFICE
CERTIFICATE OF CORRECTION

PATENT NO. : 7,236,217 B2
APPLICATION NO. : 10/346615
DATED : June 26, 2007
INVENTOR(S) : Keith M. Kotchick It is certified that error appears in the above-identified patent and that said Letters Patent is hereby corrected as shown below:

Column 2,
Line 6, delete "optical-films" and insert -- optical films --, therefor.

Column 6,
Line 50, delete "306;" and insert -- 306 --, therefor.

Column 7,
Line 13, delete "Within" and insert -- within --, therefor.

Column 10,
Line 10, delete "alignment" and insert -- alignment --, therefor.
Line 45, delete "fling" and insert -- film --, therefor.

Column 11,
Line 48, delete "banded" and insert -- bonded --, therefor.

Column 12,
Line 12, delete "hat" and insert -- hot --, therefor.
Line 27, delete "fibs" and insert -- ribs --, therefor.

Signed and Sealed this

Twenty-eighth Day of August, 2007

JON W. DUDAS
*Director of the United States Patent and Trademark Office*